Figure 1:
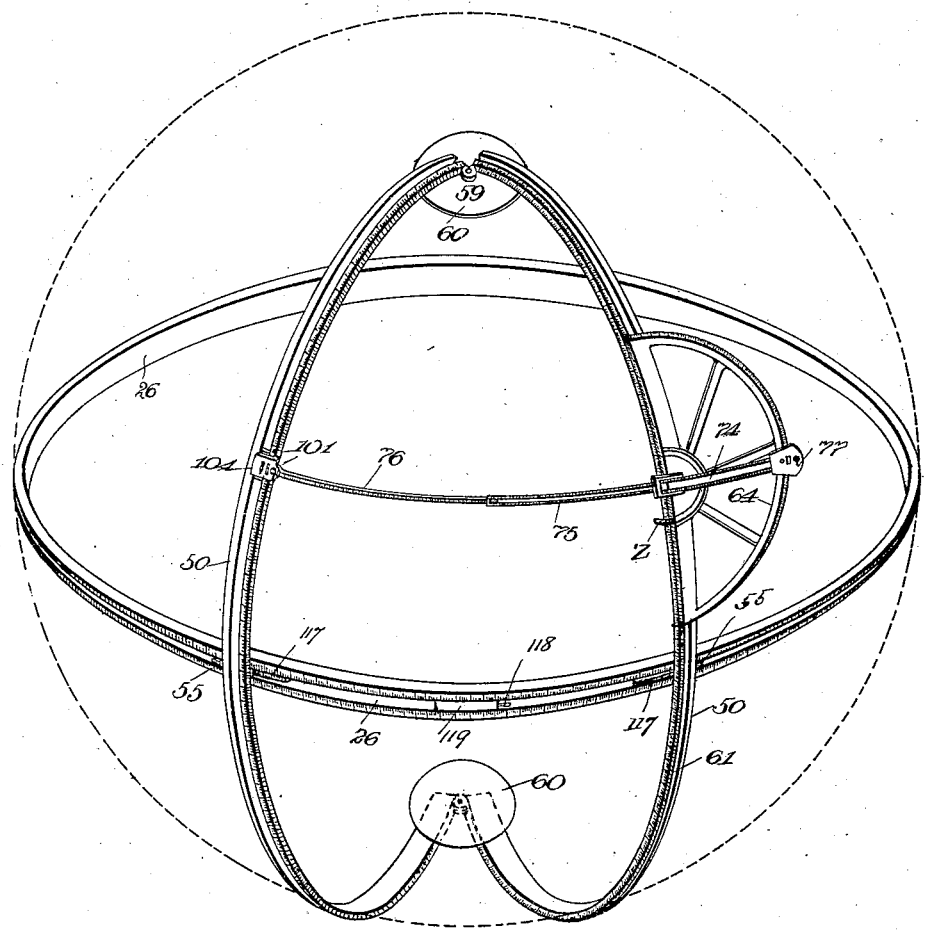

M. ROCA.
APPARATUS FOR NAUTICAL CHARTING AND NAVIGATING.
APPLICATION FILED SEPT. 14, 1910.

1,016,176.

Patented Jan. 30, 1912.

3 SHEETS—SHEET 1.

WITNESSES:

INVENTOR
Miguel Roca
BY
ATTORNEYS

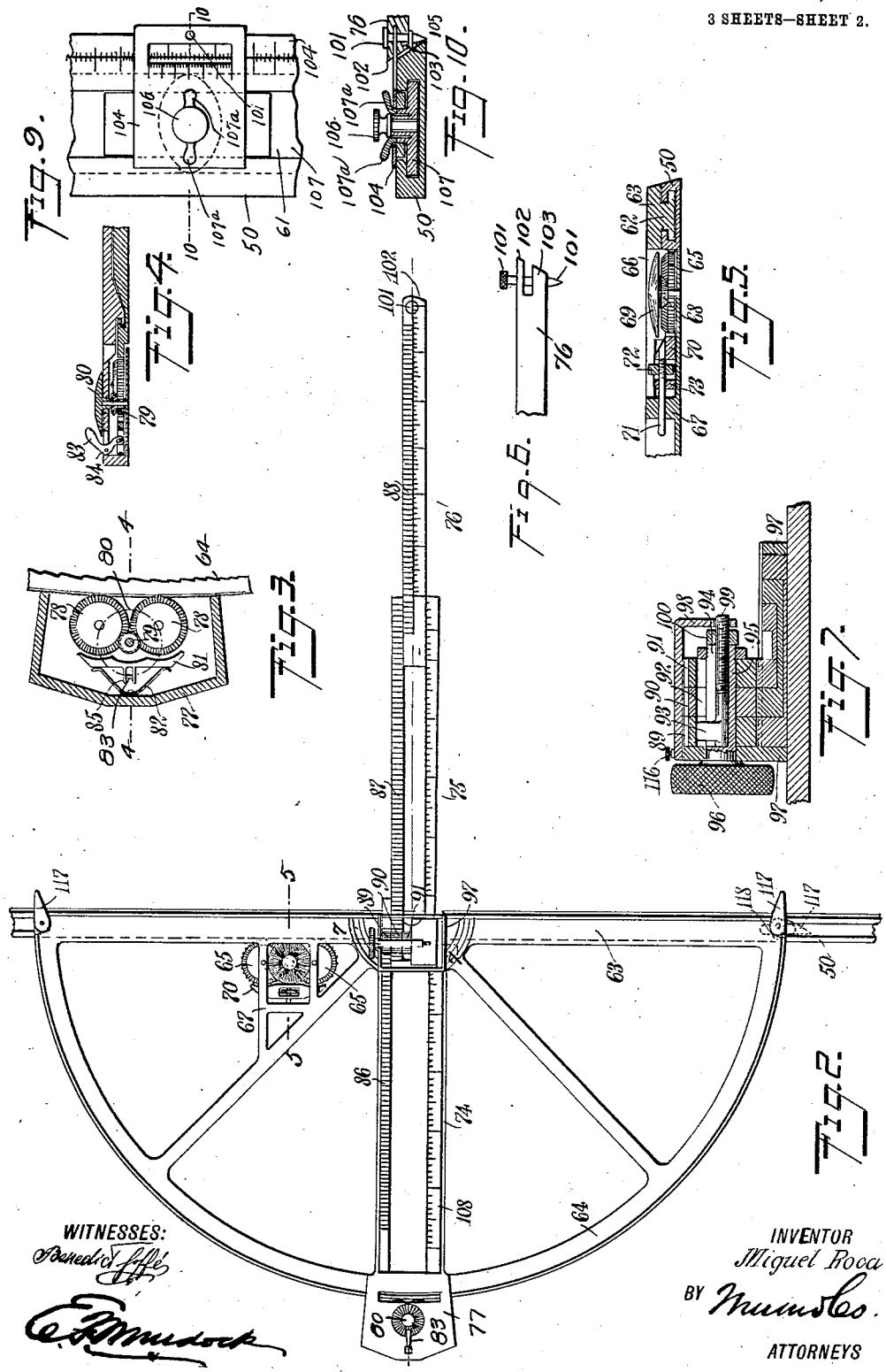

M. ROCA.
APPARATUS FOR NAUTICAL CHARTING AND NAVIGATING.
APPLICATION FILED SEPT. 14, 1910.
1,016,176.
Patented Jan. 30, 1912.
3 SHEETS—SHEET 3.
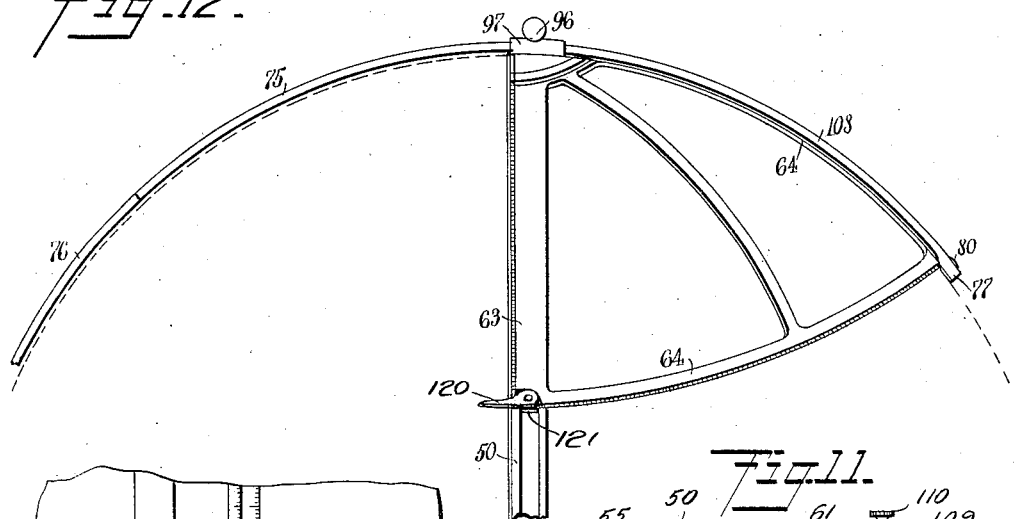
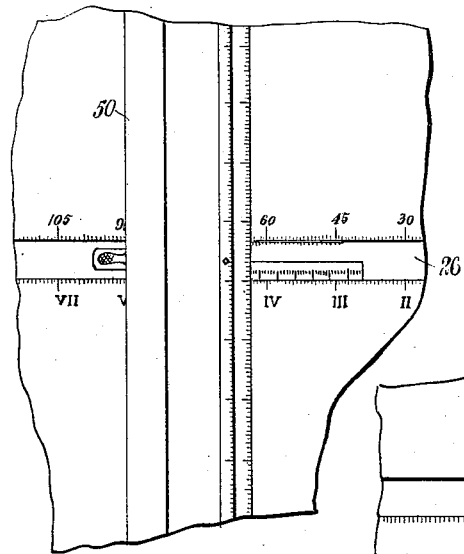
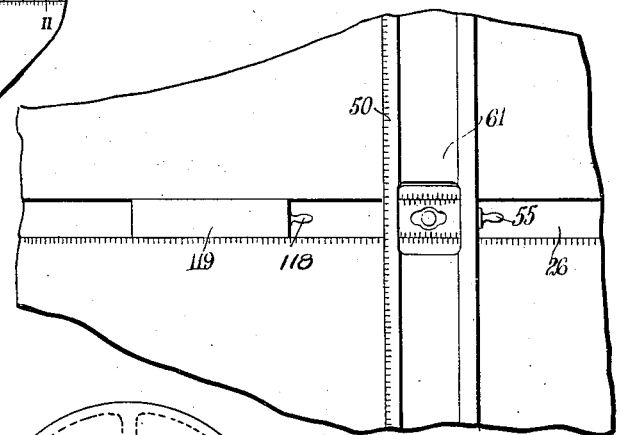
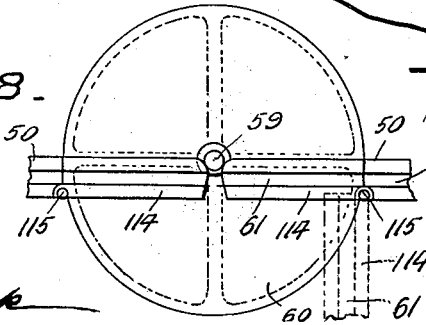
WITNESSES:
INVENTOR
Miguel Roca
BY
ATTORNEYS
COLUMBIA PLANOGRAPH CO., WASHINGTON, D. C.

UNITED STATES PATENT OFFICE.

MIGUEL ROCA, OF NEW YORK, N. Y.

APPARATUS FOR NAUTICAL CHARTING AND NAVIGATING.

1,016,176.  Specification of Letters Patent.  Patented Jan. 30, 1912.

Application filed September 14, 1910. Serial No. 582,023.

*To all whom it may concern:*

Be it known that I, MIGUEL ROCA, a subject of the King of Spain, and a resident of the city of New York, New Brighton, borough of Richmond, in the county of Richmond and State of New York, have invented a new and Improved Apparatus for Nautical Charting and Navigating, of which the following is a full, clear, and exact description.

Among the principal objects which the present invention has in view are: to provide for a geographical sphere two revoluble half-rings pivotally mounted upon said sphere and at the geographical poles thereof, said half-rings coinciding with the geographic meridian markings on said sphere; to provide a protractor slidably mounted on and carried by said half-rings for employment in locating the ship's position from observation data stellar and solar, and for working charting problems; to provide a block-guide to connect with the said protractor and mounted on said half-rings; and to provide micrometer adjustments for the various sliding members.

One embodiment of the present invention is disclosed in the structure illustrated in the accompanying drawings, in which like characters of reference denote corresponding parts in all the views, and in which—

Figure 1 is a perspective view of an apparatus constructed and arranged in accordance with the present invention; Fig. 2 is a detail view, on an enlarged scale, of the protractor and extensible finder therefor; Fig. 3 is a detail view in plan, showing the micrometer carriage for the finder on the protractor; Fig. 4 is a detail view in section, taken on the line 4—4 in Fig. 3; Fig. 5 is a detail view in section, taken on the line 5—5 in Fig. 2; Fig. 6 is a detail view in side elevation of the end of the protractor arm; Fig. 7 is a detail view in section, taken on the line 7—7 in Fig. 2; Fig. 8 is a detail view, on an enlarged scale, fragmentary in form, of the half-rings and pivotal mounting therefor; Fig. 9 is a detail view in plan, of a portion of a meridian ring and a marking and block-guide therefor; Fig. 10 is a detail view in section, taken on the line 10—10 in Fig. 9; Fig. 11 is a detail view, on an enlarged scale and partly in section, of the locking device and the micrometer adjustment of the meridian rings; Fig. 12 is a detail view, on an enlarged scale, of the protractor employed in conjunction with the half-rings, the rule of the protractor being shown as partly extended; Fig. 13 is a detail view, fragmentary in form and on an enlarged scale, showing a section of a half-ring in conjunction with the equatorial groove and a filling block therefor; and Fig. 14 is a detail view of a modified form of the mounting of one of the half-rings with vernier plates outside.

In the drawings, and in Fig. 1 thereof, the apparatus is shown as applied to a geographical globe of any suitable construction and arrangement. The globe is indicated in said Fig. 1. Let into the structure of the globe and flush with the surface thereof is a grooved ring 26. The ring 26 is mounted on the globe immovably, and serves as a support or guide for the half-rings 50, 50. The half-rings 50, 50 are pivoted at 59, 59 on the plates 60, 60, which plates are secured at the geographical poles of the globe.

The half rings 50, 50 are guided in the groove of the ring 26 by means of a guide block 48. The guide block 48 extends within the groove of the ring 26 and is held adjustably therein by a brake plate 51. The inner portions of the brake plate 51 have formed thereon downwardly extended and relatively parallel lugs 52. Between the lugs 52 is forced a wedge-shaped end of the lever 53. The lever 53 is pivotally mounted at 54 in the block 48, and is provided with a thumb rest 55.

The operation of the lever 53, by depressing the thumb rest 55, forces the wedged end of the said lever between the lugs 52, and forces outward on both sides the plates 51 into holding engagement with the sides of the groove of the ring 26, thereby holding the half-rings 50, 50 in fixed relation on the globe.

The half-rings 50, 50 are provided with an under-cut groove 61, to receive in sliding relation either the rectangular extension 62 formed on the straight edge 63 of a protractor 64, or the block 107 carrying the plate 104, as seen in Figs. 3, 5 and 10 of the drawings. The half-rings 50 are engraved in degrees and subdivisions of degrees on one edge and at the upper and lower angle thereof, to register with the vernier markings on the plate 104, and also with the markings on the straight edge of the protractor 64. On the rear edge of the half-rings 50, 50 there is provided a serrated or milled surface with which the wheels 65, 65 engage. The wheels 65, 65 are mounted on vertical spindles in a housing 66 carried by the frame 67 of the protractor 64. The wheels 65 are each in mesh with a small pinion 68. The pinion 68 is mounted on a vertical spindle, the upper end whereof is provided with a thumb screw 69. The diametric ratio between the wheels 65 and the pinion 68 is such that one revolution of the wheel 65 is equivalent to many revolutions of the pinion 68, therefore the movement through a suitable arc on the part of the pinion 68 results in the movement through a small arc on the part of the wheels 65. In this manner a micrometer movement is imparted to the protractor 64 to adjust the same lengthwise of the half-rings 50, 50.

When it is desired to lock the wheels 65, 65 and pinion 68, this is accomplished by moving a brake arm 70 against the periphery of the wheel. To accomplish this the arm 70 is provided with a screw threaded extension 71, on the screw threaded section whereof is mounted in thread engagement therewith a small knurled nut 72. The nut 72 rests against a partition 73 carried in the frame 67, and in which the said extension 71 is guidably mounted. When the nut 72 is turned to advance the extension 71 and the brake arm 70, the latter is forced against the periphery of the wheels 65, 65 to prevent the rotation thereof.

The protractor 64 is semi-circular in shape, and preferably formed in a spider construction, as shown in Fig. 2 of the drawings. The protractor is further curved or cupped to coincide with the spherical curvature of the globe so that the curved member of the protractor and the straight edge 63 settle firmly upon the corresponding half-rings 50, 50 in all positions. Mounted upon a pivot plate having a free center is a movable arm 74. The arm 74 is recessed, as shown in Fig. 2 of the drawings, to receive in telescopic arrangement the arms 108, 75 and 76, the latter being telescopically mounted between the lateral members of the arm 75, all of the said arms being nested telescopically in a groove formed in the arm 74.

The arm 74 is provided at the outer end thereof with a small case 77, wherein is supported friction wheels 78, 78, which bear against the curved arm of the protractor 64, and which are each engaged with a small pinion 79. The construction of the wheels 78, 78 and the pinion 79 is similar to that described with reference to the wheels 65, 65 and pinion 68. The pinion 79 is rotated by a thumb screw 80. A brake shoe 81 is pressed normally by a spring 82 mounted within the case 77 between and against the wheels 78 to hold immovable the said wheels against the periphery of the protractor 64. It is to release the wheels 78 from the hold of the brake shoe 81 that I have provided a lever 83.

The lever 83 is pivotally mounted in the case 77 at 84, and is extended between arms 85 extended from the said brake shoe 81. The operation of the lever 83 serves to remove the brake shoe 81 from holding engagement with the wheels 78, 78. In this position the arms 74 may be rotated upon the pivot about the protractor 64 to any desired position.

The upper edge of each of the arms 108, 74, 75 and 76 is provided in one side with racks 86, 87 and 88, which racks are arranged to mesh with the gear wheels 89, 90 and 91. The wheels 89, 90 and 91 are slotted at 92 to receive in traveling arrangement a head 93, as seen best in Fig. 7. The head 93 is mounted in a slot 94 of the tubular shaft 95, upon which the said wheels are rotatively mounted. Upon the opposite side of the said arms there are provided divisions indicating degrees and minutes, and beginning at the point of the stylus 101. These divisions extend to the end of the last arm 108, and are adjusted to a micrometer vernier which is provided upon the central frame 97, and which is employed to ascertain the exact extension of the arms 108, 74, 75 and 76, which arms I have named the "Rule", in any position.

The shaft 95 has fixedly connected therewith a knurled wheel 96, supported on the frame 97, having a laterally extended bracket 98, the opposite end whereof is depended to form a guide for a screw 99 upon which is formed the head 93.

The purpose of the construction employing the screw 99 and the head 93 is that either of the wheels 89, 90 or 91 may, at will, be operatively connected with the shaft 95 independent of the other of said wheels. In this manner it is within the control of the operator to extend the rule or to retract the same within the recess formed in the arm 74. A lock nut 116 impinges upon the shaft 95 of the wheel 96 to prevent any shift of the said wheel or change of the extension of the rule while moving the members of the apparatus.

The adjustment of the screw 99 to aline the head 93 with one or the other of the said wheels is accomplished by means of a nut 100, which, on being turned, bears against the shaft 95 to draw the screw and the head 93 outward, or against the depended bracket 98 to force the said head inward. The frame 97 is fixedly mounted on the arm 74.

The rule is shaped to conform to the curvature of the globe so that the case 77 at the one end of the said rule, and the stylus 101 at the other end of the said rule, when extended, rest lightly on the surface of the said globe, and this in all positions of the extended rule as rotated around the center of the protractor 64.

The stylus 101 is constructed in form and of material to suit. The stylus is vertically adjustable. When lifted away from the surface of the globe or chart its function as a marking device ceases. In this position it is used as a pivot for the swing of the rule when the plate 104 or other member of the apparatus is moved, which movement requires a pivotal action at this point. In Figs. 9 and 10 I have illustrated the preferred form for mounting the stylus 101. In this form the stylus is extended in normal arrangement through a perforation in the plate 104 and a bracket 105 extended from the said plate. The plate 104 is arranged to overlie the groove 61, and is provided with a vernier plate, the divisions on which are adjusted to the graduate markings on the upper graduated edge of the said half-rings 50, 50.

The plate 104 is adapted for installation upon the said half-rings 50, 50, and for quick removal therefrom. The plate is provided with a pivot pin 106 to which is secured the elongated block 107 and turned by the handle 107ª. The block in connection with the plate 104 I call, for convenience, the guide. The block 107 is adapted to extend under the overhung sides of the groove 61, as shown in Fig. 10 of the drawings. The extensions 102 and 103 are to be held between the plate 104 and the bracket 105.

The half-rings 50, 50 are shifted on the blocks 48 when the said blocks are set by depressing the thumb rest 55 of the lever 53. The adjustment is a micrometer adjustment, and is effected by turning the knurled head 110 which is formed on the shaft 109 and at the outer end thereof. At the lower end of the shaft 109 is a bevel gear wheel 111. The gear wheel 111 is meshed with a matched gear wheel 112, which is fixedly mounted on the screw 113. The screw 113 is rotatably mounted in an arm 113ª extended into the groove of the ring 26, as seen best in Fig. 11 of the drawings. The threaded end of the screw 113 is inserted in the block 48. Attached to the half-rings 50, 50, and at the portion which may be termed the front edge of the said rings. are the sliding plates 117. The plates 117 are half the width of the groove in the ring 26 and are engraved as verniers for employment in conjunction with the markings on the ring 26. The plates 117 on the two half-rings 50 are arranged to pass each other when the front edges of the said rings are brought together, as best seen in Fig. 1 of the drawings. By manipulating the head 110 the screw 113 is rotated to shift the half-rings 50, 50 on the blocks 48.

The protractor 64 may be located at any point throughout the length of both half-rings 50. Thus the center of the said protractor can be fixed in any desired latitude. The same disposition may be made of the guide plate 104.

It will be understood that the stylus or protractor may be locked on its half-ring to serve as a pivot for the swing of the other plate or protractor and the marking device attached thereto.

The marking device may be the stylus 101 when moving the plate 104 or a sharpened pencil point. In any case the path of the marking device, when drawn along the lower graduated edge of the half-rings, will inscribe upon the surface of the globe the corresponding longitude meridian, or any desired arc extension of it, which extension may be measured by the graduation shown upon the said edge.

Both upper edges of the groove of the ring 26 have graduate markings indicating the geographical longitude. One of the said edges is arranged to show the graduation in the degrees and minutes of a geographical circle, while the other edge is arranged to show the hours and minutes of time. Both are graduated from a common starting point corresponding to the almanac meridian. The blocks 48 are provided with verniers, each adjustable to the graduate markings on the adjacent edges of the groove of the ring 26, whereby the half-rings 50, 50 may be placed, either or both, with reference to the time or geographical divisions. The necessary ordinals are employed to designate the various meridians east and west from the zero or almanac meridian. The half-rings 50, 50 are each provided with graduate markings coincident or corresponding with the altitudes north and south from the equator indicated on the globe used. In this manner it will be seen that the half-rings may be adjusted to aline with all the meridians on the globe, the altitude of one locality alined therewith being ascertained by the readings on the half-rings 50, 50. The meridian of the locality is ascertained by reading the markings adjacent the groove of the ring 26. As stated, the one side of the rule 108, 75 and 76 is provided with graduate markings indicating degrees and minutes, which may be read as nautical miles. The said reading will indicate the extension given the rule in degrees and minutes of arc, or in nautical miles.

The sections 114, 114 being removable, the protractor on the one half-ring 50 may be carried past the pivotal connection of the said half-ring at the terrestrial poles, although the opposite half-ring 50 may be disposed at an angle greater than 90° to the first half-ring, in which position, if the rings were solid, the one ring would impinge upon and prevent the extension of the protractor in the manner described. The sections 114, 114 are pivoted at 115, 115, and are adapted to assume the position shown in dotted lines in Fig. 8.

The employment of the apparatus in some of its uses is to ascertain the arc of the Great Circle; to show the dead reckoning between the points of departure and destination; and to give the initial course. The apparatus is capable for employment in plotting or locating points, ascertained by any of the usual methods, or siderial observation for terrestrial location, commonly known as navigation findings. The apparatus may likewise be employed in the chartings of the heavens as an aid to astronomy, and in all uses without mathematical calculations.

As an illustration of the employment of the apparatus in finding the longitude of the position of a ship when the latitude is found, the following method is used: Let it be supposed there is known the altitude of an aster, the chronometrical time when the altitude was taken, and the latitude of the observer. The center of the protractor, mounted on one of the half-rings, is placed on the point of the globe radially in line with the aster of which observation is taken. By means of the Nautical Almanac the declination and right ascension of the aster is known with reference to the chronometrical time when the latitude was taken. Now, assuming its declination as the latitude, and reducing to longitude its right ascension by comparing the said right ascension with the siderial time, the rule is extended from the said protractor in the direction approximately opposite that from which the observation was taken as many degrees from the center of the protractor as is represented by the complement of the true altitude. Now, by turning the rule on the center of the protractor, the stylus will draw upon the globe an arc crossing the parallel of latitude on the observer's longitude. If the rule has been previously connected with the guide, this being fixed on the observer's latitude upon the other half-ring, the last half-ring will show on the graduations of the equatorial ring the value of said longitude.

For the convenience in shifting the stylus 101 when marking an arc or line therewith, where said line passes over the groove of the ring 26, I have provided a filling block 119. The filling block 119 is insertible in the groove of the ring 26 at any point. It will be understood, also, that any number of blocks 119 may be employed. The blocks 119 are held rigidly in the groove of the ring 26 by depressing the lever 118, as shown in Fig. 13 of the drawings. The lever 113 corresponds in all respects to the lever 53 above described as employed in conjunction with the block 48. To secure the block 119 in position the same is provided with the brake plates 51, the ends 52 whereof are spread by the end of the lever 118 in a manner similar to that above described with reference to the mechanism for holding the block 48.

The protractor 64 is locked in position on the half-rings 50, 50 by means of a lever 120, the head 121 whereof is elliptical, the major diameter of the ellipse being greater than the width of the groove 61, and for that reason impinges upon the sides of the half-rings 50.

When the instrument is constructed and arranged in the preferred form above set forth, it will be understood:—1st. That the zero line of the vernier carried by the half-rings 50, 50 attached to the block 48 in the groove of the ring 26, and adjusted to the graduated edges, shows the longitude of the graduated edge of the said half-rings 50, 50, which corresponds with the longitude pointed by the stylus of the protractor when at zero, and also the stylus of the guide; and when the half-rings are brought together they mark the same longitude; 2nd. That by rotating the globe upon the support therefor, all and every point of the surface of the globe will pass under the said half-rings; that is, said rings can be thus fixed at any desired longitude; 3rd. That the protractor 64 can be located in any point of both half-rings, and so attached give a complete rotating to the globe; and thus its center will mark, if desired, any parallel of latitude; and that the guide 107–104 may also be located and do the same; that either stylus (of both protractor and guide), when the corresponding half-rings are fixed in a given longitude, by sliding said members upon said half-rings, will draw the corresponding longitude meridian. The same result may be obtained with a well pointed pencil drawn along the said half-rings' lower edges; 4th. That the protractor 64, being in a fixed point on the groove 61, or sliding thereon, the rule can be extended by means of the shaft 95 over the globe, and when held by the screw 116 in any desired extension, the stylus on the end of the rule, will, by moving the arm 74, mark the corresponding arc of circle having for its center the protractor's center.

Having thus described my invention, I claim as new and desire to secure by Letters Patent.

1. An apparatus for nautical charting and navigating, comprising a solid ring having graduate markings thereon and adapted to aline with the equatorial line of a geographical globe; a plurality of rings slidingly mounted upon said first mentioned ring and perpendicularly extended thereon, said second mentioned rings being provided with graduate markings; and an extensible connecting device slidingly mounted upon both of said ring sections, said device having graduate markings thereon.

2. An apparatus for nautical charting and navigating, comprising a solid ring having graduate markings thereon and adapted to aline with the equatorial line of a geographical globe; a plurality of rings slidingly mounted upon said first mentioned ring and perpendicularly extended thereon, said second mentioned rings being provided with graduate markings; an extensible connecting device slidingly mounted upon said ring sections, said device having graduate markings thereon; and locking devices for holding any of the said rings or connecting device in fixed relation each with the other.

3. An apparatus for nautical charting and navigating, comprising a solid ring having a groove formed therein and having graduate markings thereon adapted to aline with the equatorial line of a geographical globe; a plurality of ring sections slidably mounted upon said ring and pivotally connected each with the other in line with the axis of said ring, said ring sections having graduate markings thereon; and an extensible connecting device slidingly mounted upon said ring sections, said device having graduate markings thereon.

4. An apparatus for nautical charting and navigating, comprising a solid ring having a groove formed therein and having graduate markings thereon adapted to aline with the equatorial line of a geographical globe; a plurality of ring sections slidably mounted upon said ring and pivotally connected each with the other in line with the axis of said ring, said ring sections having graduate markings thereon, an extensible connecting device slidingly mounted upon said ring sections, said device having graduate markings thereon; and locking devices for holding said ring sections in fixed relation to said ring.

5. An apparatus for nautical charting and navigating, comprising a solid ring having formed therein a groove and provided with graduate markings thereon, said markings corresponding with the geographical markings of a map, to indicate the geographical longitudes and divisions thereof; a plurality of ring sections slidingly mounted upon said solid ring and perpendicularly extended thereon, said ring having graduate markings, said markings corresponding with the geographical markings of a map, indicating the parallels of latitude and divisions thereof; and an extensible connecting device slidingly mounted upon said ring sections, said device having graduate markings thereon.

6. An apparatus for nautical charting and navigating, comprising a solid ring having a groove formed therein and provided with graduate markings on the opposite sides of said groove, one of said markings corresponding to the geographic degrees of longitude and subdivisions thereof, the opposite markings indicating time and divisions thereof; a plurality of ring sections slidingly mounted upon said solid ring and having graduate markings formed thereon to correspond with the geographic parallels of latitude and subdivisions thereof; and an extensible device connecting the said ring sections and slidingly mounted thereon, said device having graduate markings to indicate miles and divisions thereof.

7. An apparatus for nautical charting and navigating, comprising a solid ring having graduate markings thereon, said markings corresponding with the geographic divisions of longitude and subdivisions thereof; a plurality of ring sections slidingly mounted upon said solid ring and pivotally connected each with the other on the axis of said solid ring; a protractor slidingly mounted upon one of said ring sections; an extensible member slidingly mounted upon said protractor, said extensible member having graduate markings thereon indicating miles and subdivisions thereof; and locking devices for holding said protractor on said ring section.

8. An apparatus for nautical charting and navigating, comprising a solid ring having graduate markings thereon, said markings corresponding with the geographic degrees of longitude and subdivisions thereof; a plurality of ring sections slidingly mounted upon said solid ring and pivotally connected each with the other on the axis of said solid ring; a protractor slidingly mounted upon one of said ring sections; an extensible member slidingly mounted on said protractor, said extensible member having graduate markings thereon indicating miles and subdivisions thereof; locking devices for holding said protractor on said ring section; and a sliding member pivotally connected with the extended end of said extensible device and mounted on the ring section opposite that carrying the said protractor.

9. A method of and apparatus for nautical charting and navigating, comprising a solid ring having graduate markings corresponding with the geographic degrees of longitude and subdivisions thereof; a plurality of ring sections slidingly mounted upon said solid ring and pivotally connected each with the other on the axis of said solid ring, said ring sections being provided with graduate markings corresponding with the geographic parallels of latitude and subdivisions thereof; a protractor adjustably mounted on any of said ring sections, said protractor being provided with graduate markings radially arranged, said markings corresponding with the divisions of a circle in degrees, minutes and seconds; an extensible connecting device slidingly mounted upon said protractor and provided with graduate markings corresponding to miles and subdivisions thereof; and a sliding device mounted on any of said ring sections to give the reading of said graduate markings thereon, said device being pivotally connected with said extensible device.

10. An apparatus for nautical charting and navigating, comprising a solid ring having graduate markings thereon and adapted to aline with the equatorial line of a geographical globe, said markings corresponding with the geographic markings of the globe corresponding with the degrees of longitude and subdivisions thereof; a plurality of ring sections slidingly mounted upon said solid ring and pivotally connected each with the other in line with the axis of said ring, said ring sections having graduate markings thereon corresponding with the geographic markings indicating the parallel of latitude; a protractor adjustably mounted upon any of said ring sections, said protractor having graduate markings thereon indicating the divisions of a circle in degrees, minutes and seconds and also markings thereon to indicate the compass divisions and subdivisions; and extensible connecting arm slidingly mounted upon said protractor, said arm having graduate markings thereon corresponding with units of linear measure and subdivisions thereof, a device slidingly mounted upon the other of said ring sections adapted to be pivotally connected with the end of said extensible connecting arm and provided with markings to be read in conjunction with said ring sections; and locking devices connected with said ring sections and extensible device for locking said rings and device in fixed relation each to the other.

11. An apparatus for nautical charting and navigating, comprising a solid ring having graduate markings thereon and adapted to aline with the equatorial line of a geographical globe, said markings corresponding with the geographic markings of the globe corresponding with the degrees of longitude and subdivisions thereof; a plurality of ring sections slidingly mounted upon said solid ring and pivotally connected each with the other in line with the axis of said ring, said ring sections having graduate markings thereon corresponding with the geographic markings indicating the parallels of latitude; a protractor adjustably mounted upon one of said rings, said protractor having graduate markings thereon indicating the divisions of a circle and also markings thereon to indicate the compass divisions and subdivisions; and extensible connecting arm slidingly mounted upon said protractor, said arm having graduate markings thereon corresponding with units of linear measure and subdivisions thereof, a device slidingly mounted upon another of said ring sections, adapted to be pivotally connected with the end of said extensible connecting arm, and provided with markings to be read in conjunction with said ring sections; locking devices connected with said rings and extensible device for locking said rings and device in fixed relation each to the other; and suitable micrometer adjustment mechanisms for adjusting said ring sections upon said ring and the extended end of said extensible connecting arm.

In testimony whereof I have signed my name to this specification in the presence of two subscribing witnesses.

MIGUEL ROCA.

Witnesses:
E. F. MURDOCK,
PHILIP D. ROLLHAUS.

---

Copies of this patent may be obtained for five cents each, by addressing the "Commissioner of Patents, Washington, D. C."